United States Patent
Biemans et al.

(10) Patent No.: US 12,521,443 B2
(45) Date of Patent: Jan. 13, 2026

(54) CONJUGATE PRODUCTION

(71) Applicant: GLAXOSMITHKLINE BIOLOGICALS SA, Rixensart (BE)

(72) Inventors: Ralph Leon Biemans, Rixensart (BE); Elisabeth Marie Monique Bertaud, Isnes (BE)

(73) Assignee: GlaxoSmithKline Biologicals SA, Rixensart (BE)

( * ) Notice: Subject to any disclaimer, the term of this patent is extended or adjusted under 35 U.S.C. 154(b) by 783 days.

(21) Appl. No.: 17/608,230

(22) PCT Filed: May 7, 2020

(86) PCT No.: PCT/IB2020/054336
§ 371 (c)(1),
(2) Date: Nov. 2, 2021

(87) PCT Pub. No.: WO2020/229964
PCT Pub. Date: Nov. 19, 2020

(65) Prior Publication Data
US 2022/0211859 A1    Jul. 7, 2022

(30) Foreign Application Priority Data

May 10, 2019  (EP) ..................................... 19173917
Jun. 8, 2019   (EP) ..................................... 19179208

(51) Int. Cl.
| | | |
|---|---|---|
| *A61K 47/64* | (2017.01) | |
| *A61K 39/00* | (2006.01) | |
| *A61K 39/09* | (2006.01) | |
| *A61P 31/04* | (2006.01) | |
| *B01D 15/38* | (2006.01) | |
| *B01D 15/42* | (2006.01) | |

(52) U.S. Cl.
CPC .......... *A61K 47/646* (2017.08); *A61K 39/092* (2013.01); *A61K 47/6415* (2017.08); *A61P 31/04* (2018.01); *B01D 15/3804* (2013.01); *B01D 15/424* (2013.01); *A61K 2039/575* (2013.01); *A61K 2039/6037* (2013.01)

(58) Field of Classification Search
CPC .............. A61K 47/646; A61K 47/6415; A61K 39/092; A61K 2039/575; A61K 2039/6037; A61P 31/04; B01D 15/3804; B01D 15/424
See application file for complete search history.

(56) References Cited

U.S. PATENT DOCUMENTS

| | | |
|---|---|---|
| 5,795,580 A | 8/1998 | Jennings et al. |
| 2016/0324950 A1 | 11/2016 | Anderson et al. |

FOREIGN PATENT DOCUMENTS

| | | |
|---|---|---|
| EP | 0667787 A1 | 8/1995 |
| WO | 2009010877 A2 | 1/2009 |

OTHER PUBLICATIONS

International Search Report and Written Opinion in corresponding International Application No. PCT/IB2020/054336, mailed Jul. 20, 2020 (14 pages).

*Primary Examiner* — Robert A Zeman

(57) ABSTRACT

This application relates to methods for the production of polysaccharide antigen-carrier protein conjugates, in particular conjugates of Group B *Streptococcus* (GBS) capsular polysaccharide and a carrier protein, in particular CRM197. The methods comprise a hydroxyapatite chromatography step in order to separate the conjugate from free polysaccharide and free carrier protein.

9 Claims, 6 Drawing Sheets
Specification includes a Sequence Listing.

Fig. 2

| | |
|---|---|
| Ia | [→4)-β-D-Glc*p*-(1→4)-β-D-Gal*p*-(1→]ₙ<br>3<br>↑<br>1<br>β-D-Glc*p*NAc<br>4<br>↑<br>1<br>β-D-Gal*p*<br>3<br>↑<br>2<br>α-D-Neu*p*NAc |
| Ib | [→4)-β-D-Glc*p*-(1→4)-β-D-Gal*p*-(1→]ₙ<br>3<br>↑<br>1<br>β-D-Glc*p*NAc<br>3<br>↑<br>1<br>β-D-Gal*p*<br>3<br>↑<br>2<br>α-D-Neu*p*NAc |
| II | [→4)-β-D-Glc*p*NAc-(1→3)-β-D-Gal*p*-(1→4)-β-D-Glc*p*-(1→3)-β-D-Glc*p*-(1→2)-β-D-Gal*p*-(1→]ₙ<br>6                                                        3<br>↑                                                        ↑<br>1                                                        2<br>β-D-Gal*p*                               α-D-Neu*p*NAc |
| III | →4)-β-D-Glc*p*-(1→6)-β-D-Glc*p*NAc-(1→3)-β-D-Gal*p*-(1→<br>4<br>↑<br>1<br>β-D-Gal*p*<br>3<br>↑<br>2<br>α-D-Neu*p*NAc |
| V | →4)-α-D-Glc*p*-(1→4)-β-D-Gal*p*-(1→4)-β-D-Glc*p*-(1→<br>6                    3<br>↑                   ↑<br>1                   1<br>β-D-Glc*p*NAc   β-D-Glc*p*<br>4<br>↑<br>1<br>β-D-Gal*p*<br>3<br>↑<br>2<br>α-D-Neu*p*NAc |

SEQUENCE LISTING

```
<160> NUMBER OF SEQ ID NOS: 1

<210> SEQ ID NO 1
<211> LENGTH: 535
<212> TYPE: PRT
<213> ORGANISM: Corynebacterium diphtheriae

<400> SEQUENCE: 1

Gly Ala Asp Asp Val Val Asp Ser Ser Lys Ser Phe Val Met Glu Asn
1               5                   10                  15

Phe Ser Ser Tyr His Gly Thr Lys Pro Gly Tyr Val Asp Ser Ile Gln
            20                  25                  30

Lys Gly Ile Gln Lys Pro Lys Ser Gly Thr Gln Gly Asn Tyr Asp Asp
        35                  40                  45
```

```
Asp Trp Lys Glu Phe Tyr Ser Thr Asp Asn Lys Tyr Asp Ala Ala Gly
    50              55                  60

Tyr Ser Val Asp Asn Glu Asn Pro Leu Ser Gly Lys Ala Gly Gly Val
65              70              75                      80

Val Lys Val Thr Tyr Pro Gly Leu Thr Lys Val Leu Ala Leu Lys Val
                85              90                  95

Asp Asn Ala Glu Thr Ile Lys Lys Glu Leu Gly Leu Ser Leu Thr Glu
            100             105             110

Pro Leu Met Glu Gln Val Gly Thr Glu Glu Phe Ile Lys Arg Phe Gly
        115             120             125

Asp Gly Ala Ser Arg Val Val Leu Ser Leu Pro Phe Ala Glu Gly Ser
    130             135             140

Ser Ser Val Glu Tyr Ile Asn Asn Trp Glu Gln Ala Lys Ala Leu Ser
145             150             155             160

Val Glu Leu Glu Ile Asn Phe Glu Thr Arg Gly Lys Arg Gly Gln Asp
                165             170             175

Ala Met Tyr Glu Tyr Met Ala Gln Ala Cys Ala Gly Asn Arg Val Arg
            180             185             190

Arg Ser Val Gly Ser Ser Leu Ser Cys Ile Asn Leu Asp Trp Asp Val
    195             200             205

Ile Arg Asp Lys Thr Lys Thr Lys Ile Glu Ser Leu Lys Glu His Gly
    210             215             220

Pro Ile Lys Asn Lys Met Ser Glu Ser Pro Asn Lys Thr Val Ser Glu
225             230             235             240

Glu Lys Ala Lys Gln Tyr Leu Glu Glu Phe His Gln Thr Ala Leu Glu
            245             250             255

His Pro Glu Leu Ser Glu Leu Lys Thr Val Thr Gly Thr Asn Pro Val
        260             265             270

Phe Ala Gly Ala Asn Tyr Ala Ala Trp Ala Val Asn Val Ala Gln Val
    275             280             285

Ile Asp Ser Glu Thr Ala Asp Asn Leu Glu Lys Thr Thr Ala Ala Leu
    290             295             300

Ser Ile Leu Pro Gly Ile Gly Ser Val Met Gly Ile Ala Asp Gly Ala
305             310             315             320

Val His His Asn Thr Glu Glu Ile Val Ala Gln Ser Ile Ala Leu Ser
            325             330             335

Ser Leu Met Val Ala Gln Ala Ile Pro Leu Val Gly Glu Leu Val Asp
        340             345             350

Ile Gly Phe Ala Ala Tyr Asn Phe Val Glu Ser Ile Ile Asn Leu Phe
    355             360             365

Gln Val Val His Asn Ser Tyr Asn Arg Pro Ala Tyr Ser Pro Gly His
    370             375             380

Lys Thr Gln Pro Phe Leu His Asp Gly Tyr Ala Val Ser Trp Asn Thr
385             390             395             400

Val Glu Asp Ser Ile Ile Arg Thr Gly Phe Gln Gly Glu Ser Gly His
            405             410             415

Asp Ile Lys Ile Thr Ala Glu Asn Thr Pro Leu Pro Ile Ala Gly Val
        420             425             430

Leu Leu Pro Thr Ile Pro Gly Lys Leu Asp Val Asn Lys Ser Lys Thr
        435             440             445

His Ile Ser Val Asn Gly Arg Lys Ile Arg Met Arg Cys Arg Ala Ile
    450             455             460

Asp Gly Asp Val Thr Phe Cys Arg Pro Lys Ser Pro Val Tyr Val Gly
```

-continued

```
            465                 470                 475                 480
Asn Gly Val His Ala Asn Leu His Val Ala Phe His Arg Ser Ser Ser
                485                 490                 495

Glu Lys Ile His Ser Asn Glu Ile Ser Ser Asp Ser Ile Gly Val Leu
            500                 505                 510

Gly Tyr Gln Lys Thr Val Asp His Thr Lys Val Asn Ser Lys Leu Ser
        515                 520                 525

Leu Phe Phe Glu Ile Lys Ser
        530             535
```

CONJUGATE PRODUCTION

CROSS-REFERENCE TO RELATED APPLICATIONS

The present application is filed pursuant to 35 U.S.C. § 371 as a United States National Phase Application of International Patent Application Serial No. PCT/IB2020/054336, filed May 7, 2020, which claims priority to European Patent Application Nos. 19173917.6 filed May 10, 2019, and 19179208.4 filed Jun. 8, 2019. The entire contents of each of the foregoing applications are hereby incorporated by reference.

TECHNICAL FIELD

This invention relates to methods of producing and purifying conjugates of polysaccharides and protein carriers.

BACKGROUND

Bacterial capsular polysaccharides (CPS) are T-independent antigens and are generally poorly immunogenic. Covalent conjugation of bacterial CPS to a carrier molecule (such as a protein carrier) can convert T-independent antigens into T-dependent antigens, thereby enhancing memory responses and the development of protective immunity. Bacterial capsular polysaccharides conjugated to protein carriers are known for use in vaccines, including *Haemophilus influenzae* type b (Hib) conjugates (Peltola 2000), *Streptococcus pneumoniae* conjugates (Wuorimaa & Kayhty 2002) and serogroup C *Neisseria meningitidis* (MenC) conjugates (Balmer et al. 2002). Carrier proteins used in licensed vaccines include tetanus toxoid (TT), diphtheria toxoid (DT), the nontoxic CRM197 mutant of diptheria toxin, and the outer membrane protein complex from group B *N. meningitidis*.

*Streptococcus agalactiae* (also known as 'Group B *Streptococcus*' or 'GBS') is a β-hemolytic, encapsulated Gram-positive microorganism that colonizes the anogenital tract of 25-30% of healthy women. It is a major cause of neonatal sepsis and meningitis, particularly in infants born to women carrying the bacteria. The capsular polysaccharides (also referred to as capsular saccharides) of GBS serotypes are being investigated for use in vaccines, including in the form of saccharide-protein conjugates.

A need exists for efficient methods of producing and purifying conjugates of polysaccharides and protein carriers, such as conjugates of GBS capsular polysaccharide antigens and carrier proteins.

SUMMARY OF THE INVENTION

The present invention provides methods of producing conjugates of polysaccharides and carrier proteins, where sized polysaccharides are provided and conjugated with carrier proteins to provide a mixture comprising polysaccharide-protein conjugates and free polysaccharides; and carrying out a chromatography step by contacting the mixture with hydroxyapatite under conditions wherein the conjugate binds to the hydroxyapatite but free polysaccharide does not; removing free polysaccharide from the mixture; and recovering conjugate bound to the hydroxyapatite.

In an embodiment of the invention, the mixture further comprises free carrier protein, and the chromatography step is carried out under conditions wherein the conjugate and the free carrier protein bind to the hydroxyapatite.

In an embodiment of the present invention, the polysaccharide is a bacterial capsular polysaccharide.

In a further embodiment of the invention, the polysaccharide is a GBS capsular polysaccharide that has been sized to an average molecular weight of between about 50 kilodaltons (kDa) and about 200 kDa.

In an embodiment of the invention, the carrier protein is selected from tetanus toxoid, diphtheria toxoid, exotoxin A of pseudomonas (EPA), GBS pilus proteins, and CRM197.

In a further embodiment of the invention, the recovered capsular polysaccharide conjugate is mixed with a pharmaceutically acceptable diluent or carrier to provide a pharmaceutical composition.

BRIEF DESCRIPTION OF THE DRAWINGS

FIG. 2 shows the repeating structures of capsular saccharides in GBS serotypes Ia, Ib, II, III & V.

DETAILED DESCRIPTION

Figure 1:
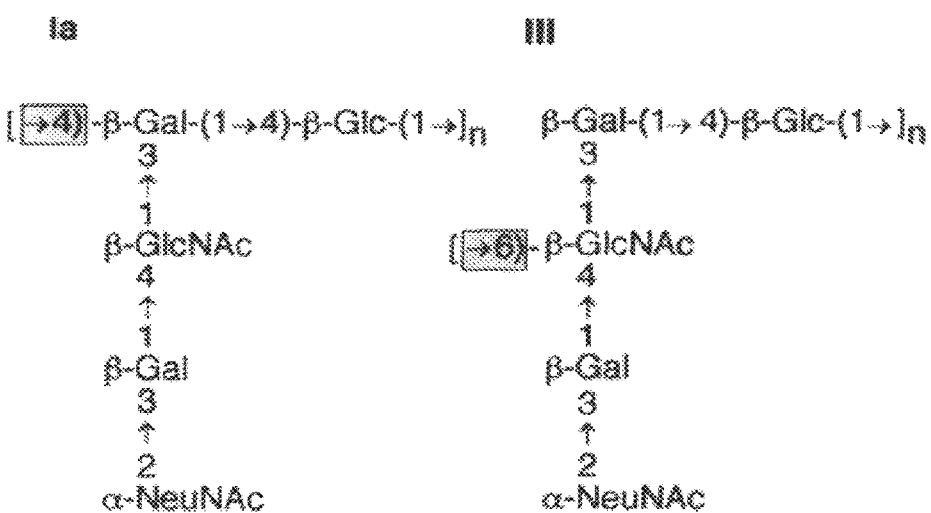
FIG. 1 shows the difference between the repeating structures in GBS serotypes Ia and III.

In producing polysaccharide-protein conjugates for medical uses, such as in vaccine preparations, it is desirable to minimize the amounts of free carrier protein (i.e., carrier protein molecules that are not conjugated to a polysaccharide molecule, also referred to as unconjugated carrier protein) and free polysaccharide (i.e., polysaccharide molecules that are not conjugated to a protein molecule, also referred to as unconjugated polysaccharide) in the bulk conjugate product.

Various methods for the removal of free carrier protein are known in the art, including hydrophobic chromatography, tangential ultrafiltration, diafiltration etc. See e.g., Lei et al. (2000), WO00/38711, U.S. Pat. No. 6,146,902. The use of gel filtration to purify GBS conjugates (as described in Anonymous (Jan 2002) *Research Disclosure*, 453077) requires a large volume of gel filtration matrix and is difficult to apply at a manufacturing scale. An alternative method that involves ultrafiltration, for example using tangential flow diafiltration with a 100 kDa membrane, is not effective unless the saccharide antigen is of a suitably high molecular weight and is thus not suitable for GBS serotype III conjugates or other conjugates where the saccharide antigen is <100 kDa. WO2009/010877 (U.S. Pat. No. 9,463,250) provides a method of removing unconjugated carrier protein using hydroxyapatite, where free carrier protein binds to hydroxyapatite.

As demonstrated in WO2009/010877 (U.S. Pat. No. 9,463,250) both Type I and Type II hydroxyapatite resin can be used in chromatography to separate conjugates of GBS polysaccharide-CRM197, from unconjugated CRM197 carrier proteins. Both the conjugates and unconjugated CRM197 will bind to the resin under appropriate conditions, and are then separately recoverable. The majority of free polysaccharide flows through without binding to the resin and is thus removed from the starting mixture. The method of hydroxyapatite chromatography described in WO2009/010877 allowed recovery of more than 80% of desialylated GBS type V capsular polysaccharide conjugated to CRM197 from a starting mixture containing both conjugates and unconjugated CRM197.

The present inventors determined that, when preparing conjugates of GBS serotype Ia or Ib polysaccharides and CRM197 according to the above process, where native GBS Ia or Ib PS was used as the starting purified saccharide, the resulting bulk conjugate product contained a high free polysaccharide (PS) content (greater than 10% of the total weight of polysaccharide in the resulting bulk product). In contrast, it was found that the amount of free PS was less in GBS serotype III bulk conjugates produced using the same process, where GBS III native PS was used as the starting purified saccharide.

Methods of separating free polysaccharide from mixtures are known in the art, including hydrophobic chromatography, tangential ultrafiltration, and diafiltration. See, e.g., Lei et al., (2000); WO 2000/038711.

The presently disclosed methods allow efficient removal of free polysaccharide from a starting mixture, where the starting mixture contains both (a) conjugates of sized bacterial polysaccharide and carrier protein, and (b) free sized polysaccharide. The starting mixture may also contain (c) free carrier protein.

GBS polysaccharide-CRM197 conjugates for GBS serotypes Ia, Ib, II, III, IV and V have been prepared in bulk using the following process:

Purified Polysaccharide (PS)
Polysaccharide Oxidation
Ultra Filtration
Conjugation with CRM197
Hydroxyapatite Chromatography
Quenching Reaction
Filtration

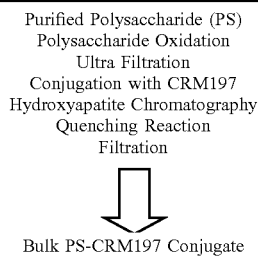

Bulk PS-CRM197 Conjugate

The conjugation step provides a mixture that contains the polysaccharide-protein conjugate, as well as free polysaccharide and free carrier protein. Hydroxyapaptide chromatography is then used to separate free polysaccharide and free carrier protein from the conjugate, providing a final bulk product comprising the polysaccharide-protein conjugate.

The present inventors determined that the size of the starting polysaccharide molecules affected the free PS content of the final bulk product, and further determined that using sized GBS Ia polysaccharide (i.e., GBS Ia polysaccharide molecules with reduced MW as compared to native or unsized GBS Ia) as the starting material (the Purified Polysaccharide) in the above process, resulted in a bulk conjugate product with decreased levels of free GBS Ia polysaccharide (compared to the level of free PS when using native or unsized GBS Ia polysaccharide as the Purified Polysaccharide in the same process). The resulting GBS serotype Ia-CRM197 conjugate was further shown to retain immunogenicity, using an animal model.

The present inventors additionally determined that using sized GBS Ib polysaccharide (i.e., GBS Ib polysaccharide molecules with reduced MW as compared to native or unsized GBS Ib) as the starting material (the Purified Polysaccharide) in the above process, resulted in a bulk conjugate product with decreased levels of free GBS Ib polysaccharide (compared to the level of free PS when using native or unsized GBS Ib polysaccharide as the Purified Polysaccharide in the same process). The resulting GBS serotype Ib-CRM197 conjugate was further shown to retain immunogenicity, using an animal model.

The present inventors additionally determined that using sized GBS II polysaccharide (i.e., GBS II polysaccharide molecules with reduced MW as compared to native or unsized GBS II) as the starting material (the Purified Polysaccharide) in the above process increased the yield of conjugate (compared to the yield when using native or unsized GBS II polysaccharide as the Purified Polysaccharide in the same process). The resulting GBS serotype II-CRM197 conjugate was further shown to retain immunogenicity, using an animal model.

Each of native GBS polysaccharide serotypes Ia, Ib and II have a higher molecular weight than native GBS polysaccharide serotype III. The MW of native GBS III is approximately 100 kDa; the MW of native GBS Ia is approximately 270 kDa; and the MW of native GBS Ib is approximately 185 kDa; the MW of native GBS II is approximately 419 kDa. The MW of CRM197 is about 60 kDa.

Thus, the invention provides a method of producing polysaccharide antigen-carrier protein conjugates, where the amount of free PS in the Bulk Conjugate Product is reduced due to the use of a sized polysaccharide as the starting purified polysaccharide (compared to amount of free PS in Bulk Conjugate Product when native or unsized polysaccharide is used). During the process, the mixture of saccharide-protein conjugate, free protein, and free polysaccharide (obtained after the conjugation step) is contacted with hydroxyapatite. Under appropriate chromatographic conditions, both the conjugate and the free protein carrier bind to the hydroxyapatite while the free polysaccharide does not; free PS can thus be separated, e.g., in chromatography flow-through. The conjugate is then recovered (eluted) from the hydroxyapatite. The free carrier protein may then also be recovered (eluted) from the hydroxyapatite and re-used in a subsequent conjugation reaction, assayed, or discarded.

Carrier Protein

Any carrier protein may be used in the methods of the present invention, provided that the carrier protein binds to hydroxyapatite under the conditions used in the present methods. Diphtheria toxoid (DT), tetanus toxoid (TT) and CRM197 (detoxified DT variant) are currently in use in commercial pediatric vaccines as carrier proteins for polysaccharide antigens. (CRM stands for Cross Reacting Material). Thus the carrier protein may be selected from those known in the art, such as, tetanus toxoid (TT), diphtheria toxoid (DT), or derivatives thereof such as CRM197 or other detoxified variants of DT (see e.g., Anderson (1983) and Anderson et al. (1985)). Other suitable carrier proteins include EPA (exotoxin A of *Pseudomonas*, see e.g., Broker et al. (2017)), and GBS pilus proteins (see e.g. WO02/34771, WO2002/012294), the *N. meningitidis* outer membrane protein (EP-A-0372501), synthetic peptides (EP-A-0378881, EP-A-0427347), heat shock proteins (WO93/17712, WO94/03208), pertussis proteins (WO98/58668, EP-A-0471177), cytokines (WO91/01146), lymphokines (WO91/01146), hormones (WO91/01146), growth factors (WO91/01146), artificial proteins comprising multiple human CD4+ T cell epitopes from various pathogen-derived antigens (Falugi et al. (2001) such as N19 (Baraldo et al. 2004), protein D from *H. influenzae* (Ruan et al. 1990; EP-A-0594610, WO00/56360), pneumolysin (Kuo et al. 1995), pneumococcal surface protein PspA (WO02/091998), iron-uptake proteins, toxin A or B from *C. difficile* (WO00/61761), etc.

In one embodiment of the invention the carrier protein is CRM197. CRM197 is a non-toxic form of the diphtheria toxin but is immunologically indistinguishable from the diphtheria toxin. (Uchida et al., Nature New Biology (1971) 233; 8-11). The CRM197 protein has the same molecular weight as the diphtheria toxin but differs from it by a single base change in the structural gene, a glycine to glutamic acid change at position 52 which makes fragment A unable to bind NAD and therefore non-toxic (Pappenheimer 1977; Rappuoli et al., 1983). The non-toxic DT carrier protein may have the amino acid sequence of SEQ ID NO:1 (CRM197); or the non-toxic DT carrier protein may have an amino acid sequence at least 90%, 95% or 99% identical to SEQ ID NO:1, provided it is non-toxic and contains an amino acid substitution at the amino acid position corresponding to position 52 in SEQ ID NO:1, such that fragment A is unable to bind NAD (e.g., a glutamic acid residue at the amino acid position corresponding to position 52 in SEQ ID NO:1).

```
      C. diphtheriae mutant CRM197
                                SEQ ID NO: 1
Gly Ala Asp Asp Val Val Asp Ser Ser Lys Ser Phe Val Met Glu Asn Phe Ser Ser Tyr His Gly Thr Lys Pro Gly Tyr Val Asp Ser Ile Gln Lys Gly Ile Gln Lys Pro Lys Ser Gly Thr Gln Gly Asn Tyr Asp Asp Asp Trp Lys Glu Phe Tyr Ser Thr Asp Asn Lys Tyr Asp Ala Ala Gly Tyr Ser Val Asp Asn Glu Asn Pro Leu Ser Gly Lys Ala Gly Gly Val Val Lys Val Thr Tyr Pro Gly Leu Thr Lys Val Leu Ala Leu Lys Val Asp Asn Ala Glu Thr Ile Lys Lys Glu Leu Gly Leu Ser Leu Thr Glu Pro Leu Met Glu Gln Val Gly Thr Glu Glu Phe Ile Lys Arg Phe Gly Asp Gly Ala Ser Arg Val Val Leu Ser Leu Pro Phe Ala Glu Gly Ser Ser Ser Val Glu Tyr Ile Asn Asn Trp Glu Gln Ala Lys Ala Leu Ser Val Glu Leu Glu Ile Asn Phe Glu Thr Arg Gly Lys Arg Gly Gln Asp -continued
Ala Met Tyr Glu Tyr Met Ala Gln Ala Cys Ala Gly Asn Arg Val Arg Arg Ser Val Gly Ser Ser Leu Ser Cys Ile Asn Leu Asp Trp Asp Val Ile Arg Asp Lys Thr Lys Thr Lys Ile Glu Ser Leu Lys Glu His Gly Pro Ile Lys Asn Lys Met Ser Glu Ser Pro Asn Lys Thr Val Ser Glu Glu Lys Ala Lys Gln Tyr Leu Glu Glu Phe His Gln Thr Ala Leu Glu His Pro Glu Leu Ser Glu Leu Lys Thr Val Thr Gly Thr Asn Pro Val Phe Ala Gly Ala Asn Tyr Ala Ala Trp Ala Val Asn Val Ala Gln Val Ile Asp Ser Glu Thr Ala Asp Asn Leu Glu Lys Thr Thr Ala Ala Leu Ser Ile Leu Pro Gly Ile Gly Ser Val Met Gly Ile Ala Asp Gly Ala Val His His Asn Thr Glu Glu Ile Val Ala Gln Ser Ile Ala Leu Ser Ser Leu Met Val Ala Gln Ala Ile Pro Leu Val Gly Glu Leu Val Asp Ile Gly Phe Ala Ala Tyr Asn Phe Val Glu Ser Ile Ile Asn Leu Phe Gln Val Val His Asn Ser Tyr Asn Arg Pro Ala Tyr Ser Pro Gly His Lys Thr Gln Pro Phe Leu His Asp Gly Tyr Ala Val Ser Trp Asn Thr Val Glu Asp Ser Ile Ile Arg Thr Gly Phe Gln Gly Glu Ser Gly His Asp Ile Lys Ile Thr Ala Glu Asn Thr Pro Leu Pro Ile Ala Gly Val Leu Leu Pro Thr Ile Pro Gly Lys Leu Asp Val Asn Lys Ser Lys Thr His Ile Ser Val Asn Gly Arg Lys Ile Arg Met Arg Cys Arg Ala Ile Asp Gly Asp Val Thr Phe Cys Arg Pro Lys Ser Pro Val Tyr Val Gly Asn Gly Val His Ala Asn Leu His Val Ala Phe His Arg Ser Ser Ser Glu Lys Ile His Ser Asn Glu Ile
```

-continued

```
Ser Ser Asp Ser Ile Gly Val Leu

Gly Tyr Gln Lys Thr Val Asp His

Thr Lys Val Asn Ser Lys Leu Ser

Leu Phe Phe Glu Ile Lys Ser
```

Group B *Streptococcus* (GBS)

The *Streptococcus agalactiae* (Group B *Streptococcus* or GBS) capsule is a major virulence factor that assists the bacterium in evading human innate immune defences. The GBS capsule consists of high molecular weight polymers made of multiple identical repeating units of four to seven monosaccharides. GBS can be classified into ten serotypes (Ia, Ib, II, III, IV, V, VI, VII, VIII, and IX) based on the chemical composition and the pattern of glycosidic linkages of the capsular polysaccharide repeating units. Non-typeable strains of GBS are also known to exist. Description of the structure of GBS CPS may be found in the published literature (see e.g., WO2012/035519).

It is estimated that 65-95% of global disease-causing isolates are either serotype Ia, Ib or III. These three serotypes of GBS (Ia, Ib and III) are estimated to cause from 65% to 75% of early onset GBS disease and from 80-90% of late onset GBS disease in Europe and the US.

Compositions comprising GBS capsular polysaccharides conjugated to a carrier protein (CPS from GBS serotypes Ia, Ib, II, III, IV and V) have been shown, in clinical testing, to be immunogenic in humans. Conjugates suitable for use in such immunogenic compositions include those where a single CPS molecule is conjugated to a single carrier protein molecule, or where a single carrier protein molecule is conjugated to multiple molecules of saccharide antigen (e.g., multiple GBS Ia saccharide molecules conjugated to the same CRM197 molecule).

GBS capsular polysaccharides used according to the present invention may be chemically modified or depolymerized. See e.g., WO2006/050341.

Saccharide & Sizing Definition

The term "saccharide" throughout this specification refers to polysaccharides (PS) and oligosaccharides. A GBS serotype polysaccharide, as used herein, refers to the GBS bacterial capsular polysaccharide of that serotype. Isolated GBS serotype polysaccharides may be "sized," i.e., their size reduced, by known methods (see for example EP497524 and EP497525). Methods of sizing polysaccharides include acid hydrolysis treatment, hydrogen peroxide treatment, sizing by EMULSIFLEX followed by a hydrogen peroxide treatment to generate saccharide fragments, and microfluidization.

Preferably the sized polysaccharide used in the methods of the present invention has an average molecular weight of between about 50 kilodaltons (kDa) and about 200 kDa, between about 70 kDa and about 170 kDa, between about 80 kDa and about 170 kDa, between about 90 kDa and about 170 kDa, between about 100 kDa and about 170 kDa, between about 100 kDa and about 160 kDa, or about 70 kDa, about 80 kDa, about 90 kDa, about 100 kDa, about 110 kDa, about 120 kDa, about 130 kDa, about 140 kDa, about 150 kDa, about 160 kDa, about 170 kDa, about 180 kDa, about 190 kDa, or about 200 kDa.

Preferably GBS capsular polysaccharide used in the methods of the present invention is selected from: sized GBS serotype Ia capsular polysaccharide having an average molecular weight of between about 80 kDa to about 110 kDa, between about 90 kDa and about 110 kDa, or about 100 kDa; sized GBS serotype Ib capsular polysaccharide having an average molecular weight of between about 80 kDa to about 110 kDa, between about 90 kDa and about 110 kDa, or about 100 kDa; and sized GBS serotype II capsular polysaccharide having an average molecular weight of between about 100 kDa to about 170 kDa, between about 110 kDa and about 170 kDa, between about 120 kDa to about 170 kDa, between about 130 kDa and about 170 kDa, between about 140 kDa to about 170 kDa, between about 150 kDa to about 170 kDa, or about 150 kDa, about 160 kDa, or about 170 kDa.

As used herein, a 'sized' polysaccharide is one that has undergone a process to reduce its molecular weight, compared to the molecular weight of the starting polysaccharide prior to the sizing process. The starting polysaccharide may be a wild-type (native) polysaccharide.

In an embodiment of the present invention, the bacterial polysaccharides are sized by mechanical cleavage, for instance by microfluidisation or sonication.

Sizing may be by a factor of no more than ×20, ×10, ×8, ×6, ×5, ×4, ×3 or ×2.

For the purposes of the invention, "sized by a factor of ×2" means the saccharide is subject to a process that reduces the size of the saccharide to one-half that of the starting polysaccharide (the polysaccharide before the sizing process, which may be a native polysaccharide). "Sized by a factor of ×3" means the saccharide is subject to a process that reduces the size of the saccharide to one-third that of the starting polysaccharide.

For the purposes of the invention, "sized by a factor no more than ×2 (or up to ×2)" means the saccharide is subject to a process that reduces the size of the saccharide, but wherein the saccharide retains a size that is at least one-half the starting polysaccharide (i.e., one-half or more). "Sized by a factor no more than ×3 (or up to ×3)" means that the saccharide is subject to a process that reduces the size of the saccharide, but wherein the saccharide retains a size of at least one-third the starting polysaccharide (i.e., one-third or more).

For the purposes of the invention, "sized by a factor of at least ×2" refers to a sizing process wherein the polysaccharide is reduced to a size that is one half or less of the starting saccharide. "Sized by a factor of at least ×3" refers to a sizing process wherein the polysaccharide is reduced to one-third or less of the starting saccharide.

For the purposes of the invention, "sized by a factor of at least ×2 and up to ×3" refers to a sizing process wherein the polysaccharide is reduced to a size that is one half or less of the starting saccharide, but is no less than one third, the size of the starting polysaccharide, inclusive of the end points (e.g., a starting saccharide of 300 kDa that is sized by a factor of at least ×2 and up to ×3 is reduced to a size between 150-100 kDa, inclusive).

The terms ×4, ×5, ×6, ×7, ×8, ×9, ×10, ×20 are to be interpreted in the same way as described above for ×2 and ×3.

For the purposes of the invention, "native" or "wildtype" polysaccharide refers to a saccharide that has not been subjected to a process, the purpose of which is to reduce the size of the saccharide.

Molecular Weight

The molecular weight or average molecular weight of a saccharide herein refers to the weight-average molecular weight (Mw) of the saccharide as measured by MALLS (Multi-Angle Laser Light Scattering). The MALLS technique is well known in the art. The molecular weight of a free or unconjugated saccharide is measured prior to conjugation to any carrier protein.

Saccharide Antigens

In one embodiment, the saccharide antigen used in the methods of the present invention is a bacterial saccharide, in particular a bacterial capsular saccharide, more particularly a GBS capsular polysaccharide. In one embodiment of the present invention, the saccharide is GBS serotype Ia capsular polysaccharide. In a further embodiment of the present invention, the saccharide is GBS serotype Ib capsular polysaccharide. In a further embodiment of the present invention, the saccharide is GBS serotype II capsular polysaccharide.

In one embodiment of the invention, the wild-type or native saccharide antigen has a molecular weight of more than 100 kDa; in a further embodiment, the wild-type or native saccharide antigen has a molecular weight of more than about 120, 140, 160, 180, 200, 220, 240, 260, 280, 300, 320, 340, 360, 380, 400, 420, 440, 460, 480 or 500 kDa; between about 160-about 300, or between any of the provided molecular weights.

In one embodiment of the invention, the saccharide antigen is a capsular saccharide selected from GBS serotype Ia, Ib and II. In particular, GBS capsular saccharides from these serotypes may be covalently linked to GlcNAc residues in the bacterium's peptidoglycan backbone. The capsular polysaccharides of different GBS serotypes are chemically related but are antigenically very different. All GBS capsular polysaccharides share the following trisaccharide core:

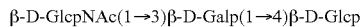

The GBS serotypes differ by the way in which this core is modified. The difference between serotypes Ia and III, for instance, arises from the use of either the GlcNAc (Ia) or the Gal (III) in this core for linking consecutive trisaccharide cores (FIG. 1). Serotypes Ia and Ib both have a [α-D-NeupNAc(2→3)β-D-Galp-(1→] disaccharide linked to the GlcNAc in the core, but the linkage is either 1→4 (Ia) or 1→3 (Ib).

As shown in FIG. 2, the capsular saccharides of five GBS serotypes include: (a) a terminal N-acetyl-neuraminic acid (NeuNAc) residue (commonly referred to as neuaminic acid or sialic acid), which in all cases is linked 2→3 to a galactose residue; and (b) a N-acetyl-glucosamine residue (GlcNAc) within the trisaccharide core.

Examples of additional bacterial capsular saccharides which may be used in the methods of the present invention include capsular saccharides from Neisseria meningitidis (serogroups A, B, C, W135 and/or Y), Streptococcus pneumoniae (serotypes 1, 2, 3, 4, 5, 6B, 7F, 8, 9N, 9V, 10A, 11A, 12F, 14, 15B, 17F, 18C, 19A, 19F, 20, 22F, 23F and 33F, particularly 4, 6B, 9V, 14, 18C, 19F and/or 23F), Streptococcus agalactiae (types Ia, Ib, II, III, IV, V, VI, VII, and/or VIII), Haemophilus influenzae (typeable strains: a, b, c, d, e and/or f), Pseudomonas aeruginosa, Staphylococcus aureus (from, for example, serotypes 5 and 8), Enterococcus faecalis or E. faecium (trisaccharide repeats), Yersinia enterocolitica, Vibrio cholerae, Salmonella typhi, Klebsiella spp., etc. Another saccharide which may be included is the Streptococcus pyogenes group-specific antigen (GAS carbohydrate).

Preparation of Capsular Saccharide Antigens

Methods for the preparation of bacterial capsular saccharide antigens are known in the art. For example, WO03/007985 describes the preparation of saccharide antigens from N. meningitidis. The preparation of saccharide antigens from H. influenzae is described in chapter 14 of Vaccine (ed Plotkin et al). The preparation of saccharide antigens and conjugates from S. pneumoniae is also described in the art. Processes for the preparation of saccharide antigens from S. agalactiae are described in detail in Wessels et al. (1990), Wessels et al. (1989), WO2006/082527.

The saccharide may be chemically modified relative to the capsular saccharide as found in nature. For example, the saccharide may be de-O-acetylated (partially or fully), de-N-acetylated (partially or fully), N-propionylated (partially or fully), etc. De-acetylation may occur before, during or after conjugation, but preferably occurs before conjugation. Depending on the particular saccharide, chemical modification such as de-acetylation may or may not affect immunogenicity; the effect of chemical modification on antigen immunogenicity can be assessed by routine assays.

Figure 3:
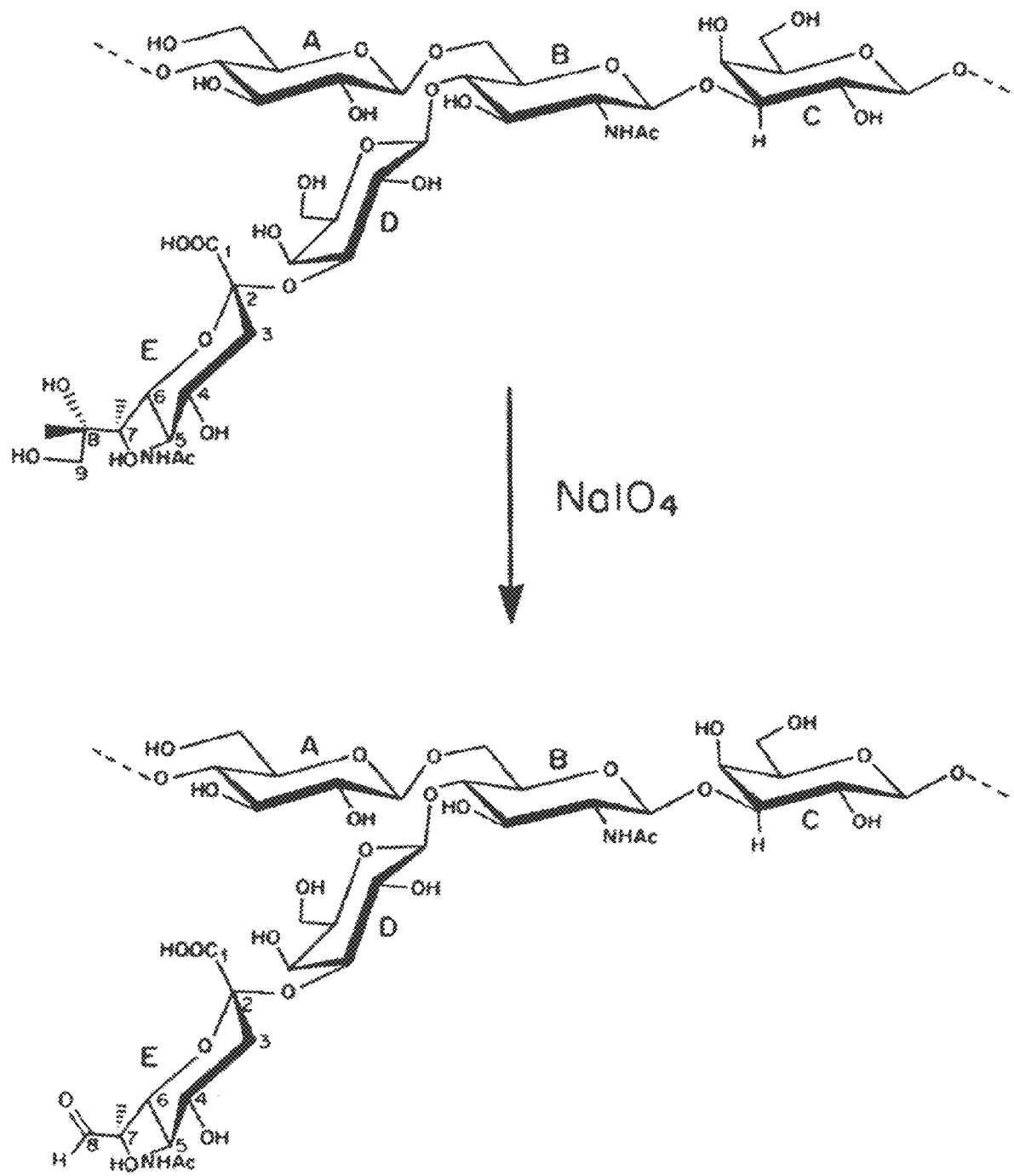
FIG. 3 shows periodate oxidation of a terminal sialic acid residue.

Saccharide antigens from GBS may be modified. For example, when the saccharide antigen is the Streptococcus agalactiae serotype V capsular saccharide, then the saccharide antigen may be modified as described in WO2006/050341. In particular, the Streptococcus agalactiae serotype V capsular saccharide may be desialylated (FIG. 3). Desialylated GBS serotype V capsular saccharide may be prepared by treating purified GBS serotype V capsular saccharide under mildly acidic conditions (e.g. 0.1M sulphuric acid at 80° C. for 60 minutes) or by treatment with neuraminidase, as described in WO2006/050341. A method for preparaing desialylated GBS serotype V capsular saccharide is by treating the purified saccharide with 1M acetic acid at 81° C. +/−3° C. for 2 h.

Saccharide-Carrier Conjugates

Bulk Conjugate product produced by the method of the present invention may include small amounts of free (i.e. unconjugated) protein carrier. When a given carrier protein is present in both free and conjugated form in a composition produced by the method of the invention, the unconjugated form is preferably present at no more than 5% of the total amount of the carrier protein in the composition as a whole (by weight), and more preferably present at less than 2%, less than 1.5%, or less than 1.0% of the total amount of the carrier protein in the composition as a whole (by weight).

Bulk Conjugate product produced by the method of the present invention may include small amounts of free (i.e. unconjugated) polysaccharide. When a given polysaccharide is present in both free and conjugated form in a composition produced by the method of the invention, the unconjugated form is preferably present at no more than 5% of the total amount of the total polysaccharide in the composition as a whole (by weight), and more preferably present at less than 2%, less than 1%, or less than 0.5% of the total amount of the carrier protein in the composition as a whole (by weight).

Any suitable conjugation reaction can be used in the methods of the present invention, with any suitable linker where necessary. Attachment of the saccharide antigen to the carrier is preferably via a —NH$_2$ group e.g. in the side chain of a lysine residue in a carrier protein, or of an arginine residue. Where a saccharide has a free aldehyde group then this can react with an amine in the carrier to form a conjugate by reductive amination. Attachment may also be via a —SH group e.g. in the side chain of a cysteine residue.

The saccharide will typically be activated or functionalised prior to conjugation. Activation may involve, for example, cyanylating reagents such as CDAP (e.g. 1-cyano- 4-dimethylamino pyridinium tetrafluoroborate (see e.g., Lees et al. (1996); WO95/08348). Other suitable techniques use carbodiimides, hydrazides, active esters, norborane, p-nitrobenzoic acid, N-hydroxysuccinimide, S-NHS, EDC, TSTU (see e.g., WO98/42721).

When the saccharide antigen is a *Streptococcus agalactiae* capsular saccharide, conjugation typically involves reductive amination of the saccharide to a carrier protein, as described in Wessels et al. (1990). The reductive amination involves an amine group on the side chain of an amino acid in the carrier and an aldehyde group in the saccharide. Where GBS capsular saccharides do not include an aldehyde group in their natural form, one is generated before conjugation by periodate oxidation of a portion of the saccharide's sialic acid residues, as shown in FIG. 3 (Wessels et al. (1990), U.S. Pat. No. 4,356,170. Conjugation of a *Streptococcus agalactiae* capsular saccharide to a carrier protein may also be carried using the methods described in WO2006/082530.

Hydroxyapatite

The hydroxyapatite ($(Ca_5(PO_4)_3OH)_2$) used in the invention may be in one of number of forms known in the art. The hydroxyapatite (HA) may be in the form of crystals, a gel or a resin. The normal crystalline form may alternatively be sintered at high temperatures to modify it to a ceramic form. Ceramic HA is available from Bio-Rad as CHT™ Ceramic Hydroxyapatite, which hydroxyapatite that has been sintered at high temperatures to modify it from a crystalline to a ceramic form, providing spherical particles. Such ceramic HA may be obtained in different particle sizes, such as about 20 µm in diameter, about 40 µm in diameter, or about 80 µm in diameter.

The hydroxyapatite may be in the form of a gelpacked into a column, as commonly used in chromatography purification.

If the hydroxyapatite is in particulate form, preferably the particles have a diameter of about 20 µm, about 40 µm, about 80 µm, between about 20 µm and about 80 µm, or between about 40 µm and about 80 µm.

pH

Preferably the present method is carried out at a pH of between 6 and 8, more preferably 6.5 to 7.5, more preferably 7.2. A pH of 7.2 is preferred as this helps stabilize the saccharide. The pH may be adjusted using acids/bases known in the art.

Phosphate Concentration

As will be known to one of skill in the art of chromatography, conditions such as the pH and salt concentration of buffers affects (a) the binding of components in the mobile phase to the stationary phase of the chromatographic column, and (b) subsequent elution (recovery) of bound components from the stationary phase. In the chromatographic step of the present methods, the chromatographic conditions are such that both free and conjugated protein initially binds to the HA solid phase while free polysaccharide does not; conditions can then be modified to separately recover the conjugate and the free protein.

In one embodiment of the present method, buffers comprising different phosphate concentrations, but at essentially the same pH, are used in the chromatography step such that both free protein and conjugated protein initially bind to HA, while free polysaccharide does not. Subsequently, chromatographic conditions are varied to elute (recover) the conjugate. Additionally, the conditions may be varied to separately recover the free protein.

Preferably the phosphate concentration of the starting material (loading buffer) is less than about 10 mM, from about 1 mM to about 10 mM, from about 1 mM to about 5 mM, from about 1 mM to about 2 mM, or about 2 mM. Elution of the conjugate (carrier protein+polysaccharide) is then carried out at a phosphate concentration of from about 5 mM to about 50 mM, from about 10 mM to about 50 mM, from about 10 mM to about 40 mM, from about 10 mM to about 35 mM. The conjugate may be eluted using two different elution buffers, for example, a first elution using a buffer of about 10 mM phosphate, and a second buffer of about 35 mM phosphate.

The free protein may subsequently be stripped from the chromatography column using a buffer with a phosphate concentration higher than that used for eluting the conjugate, e.g., from about 50 mM to about 500 mM, from about 100 mM to about 500 mM, from about 200 mM to about 500 mM, or about 400 mM.

Typically a sodium phosphate buffer is used. Alternative buffers include MES (2-(N-morpholino) ethanesulfonic acid), HEPES (4-(2-hydroxyethyl)-1-piperazineethanesulfonic acid), tris(hydroxymethyl)aminomethane, imidazole, or acetate.

Formulations, Medical Methods and Uses

The invention further provides a method of preparing a pharmaceutical composition, comprising the steps of producing polysaccharide antigen-protein conjugates according to the present methods using sized polysaccharides as the starting purified polysaccharide, and then mixing said polysaccharide antigen-carrier protein conjugates with a pharmaceutically acceptable diluent or carrier. The invention also provides the compositions prepared by said method.

Thus, conjugates (or bulk conjugate) obtained using the methods of the invention may be formulated as a pharmaceutical composition by the addition of a pharmaceutically acceptable diluent or carrier. Such formulations may further include immunological adjuvants, additional antigens, or both an immunological adjuvant and additional antigen(s).

Once formulated in a final medicinal form, such as a vaccine, the compositions of the invention can be administered to a subject in order to induce (or raise) an immune response against the polysaccharide component of the conjugate. The subjects can be non-human mammals such as mice, rats, rabbits, non-human primates, etc., or may be human subjects. The compositions may be formulated as vaccines. They may be delivered by any suitable route. The compositions of the invention may be used in prophylactic measures (to prevent disease or infection) or in therapeutic measures (to treat disease or infection). Where the polysaccharide antigen is a bacterial polysaccharide, the compositions of the invention may be used in preventin or treating infection or disease caused by that bacteria.

The invention provides a conjugate obtained using the method of the invention, for use in medicine (in therapeutic purposes, for treating an infection, for raising an immune response, and/or as a vaccine).

The invention also provides the use of a conjugate of the invention in the manufacture of a medicament for raising an immune response in a patient or treating a bacterian infection in a patient.

Conjugates of the invention may be administered in conjunction with other immunoregulatory agents. In particular, immunogenic or vaccine compositions may include an adjuvant. Adjuvants which may be used in compositions of the invention include, but are not limited to: mineral containing compositions such as aluminum salts and calcium salts; oil emulsions such as oil-in-water or squalene-water emulsions; saponin formulations; virosomes and Virus-Like Particles (VLPs); bacterial or microbial derivatives such as lipopolysaccharides and non-toxic derivatives of lipopolysaccharides such as 3-0-deacylated monophosphoryl lipid A (3dMPL); immunostimulatory oligonucleotides; liposomes; imidazoquinolone compounds; and TLR4 antagonists.

Definitions

The term "comprising" encompasses "including" as well as "consisting" e.g. a composition "comprising" X may consist exclusively of X or may include something additional e.g. X+Y.

The term "about" or "approximately" in relation to a numerical value x means, for example, x±10%. All numerical values herein can be considered to be qualified by "about" or "approximately", unless the context indicates otherwise.

The word "substantially" does not exclude "completely" e.g. a composition which is "substantially free" from Y may be completely free from Y. Where necessary, the word "substantially" may be omitted from the definition of the invention.

As used herein, a "bulk" product is one that has completed all processing stages but has not been formulated into a final medicinal product.

As used herein, "flow through" in chromatography is the fraction which contains primarily protein which does not bind to the chromatographic column under the chromatographic conditions being used.

EXAMPLES

Example 1—Production of Un-Sized GBS Conjugates

Conjugates of native (un-sized) GBS CPS were produced as follows. Purified capsular polysaccharides were obtained from a *Streptococcus agalactiae* serotype (serotype Ia, Ib, II and III). The purified GBS CPS was conjugated to a carrier protein by periodate oxidation followed by reductive amination. The carrier protein was CRM197, providing conjugates of GBS serotype Ia capsular polysaccharide-CRM197 (serotype Ia-CRM197), GBS serotype Ib capsular polysaccharide-CRM197 (serotype Ib-CRM197), GBS serotype II capsular polysaccharide-CRM197 (serotype II-CRM197) and GBS serotype III capsular polysaccharide-CRM197 (serotype III-CRM197).

As described in WO2009/010877, conjugates of GBS CPS and protein carriers can be separated from free carrier protein using hydroxyapatite (HA) chromatography. Free polysaccharide is not bound. WO2009/010877 describes using BIO-RAD HA resin of Type I and Type II, 80 µm particle size. Type I HA resin is reported to have a higher protein binding capacity and better capacity for acidic proteins, while Type II is reported to have a lower protein binding capacity but better resolution of certain proteins. Both Type I and Type II hydroxyapatite resins were reported in WO2009/010877 to be useful in separating conjugated from unconjugated CRM197, using hydroxyapatite chromatography conducted at a pH of 7.2 to ensure the stability of the saccharide (a pH of 6.8 is more typically used for hydroxyapatite chromatography; this change in pH did not affect the efficiency of the chromatography as reported in WO2009/010877). WO2009/010877 also described the use of different phosphate concentrations; CRM197 was reported to essentially completely bind to the hydroxyapatite column at a phosphate concentration of less than or equal to 35 mM in the starting material, with the equilibration/post loading wash buffer pH 7.2. Conjugate and free carrier protein could then be eluted separately.

WO2009/010877 describes a pilot process using the following parameters:
Column volume (CV)=4 Liters (L) (acceptable range: >3 L). Column selected had 20 cm diameter (corresponding height about 11 centimeters plus/minus 2.5 cm).
Column rinsing and equilibration: 5 CV of 400 mM sodium phosphate pH 6.8 buffer at 80 cm/hour (419 ml/min) plus 5 CV of 35 mM sodium phosphate pH 7.2 buffer at 80 cm/h.
Column loading and product (conjugate) collection: load product (80 cm/h) and then wash with equilibration buffer; waste flow-through up to 0.4 CV, collect conjugate product up to 2.2 CV, then waste up to 2.9 CV.
To then collect unconjugated CRM bound to the column, Column eluted with 2 CV of 400 mM sodium phosphate pH 6.8 buffer at 80 cm/h.

Example 2—Sized GBS Serotype Ia and Ib

Sizing of GBS Serotype Ia and Ib Capsular Polysaccharide

Microfluidisation technology was used to reduce the size of GBS Ia and Ib polysaccharides, to an average MW of about 100 kDa. The size reduction was done using a high-pressure homogenizer (EMULSIFLEX C50 from Avestin) equipped with a fixed geometry homogenizing cell (MICROFLUIDICS F20Y-75 µm). The size of the polysaccharide is reduced due to the high pressure in the system and shock between molecules due the configuration of homogenizing cell. The sizing is a continuous process and is followed by in-process testing to stop the process when the target size is reached.

Native GBS Ia polysaccharide at a concentration of 7.25 mg/ml, was sized via microfluidization, using a pressure of between 10000 and 15000 psi (pounds per square inch). The size reduction was followed by Size Exclusion-High Performance Liquid Chromatography (SEC-HPLC) to stop the microfluidisation. After 65 cycles, the polysaccharide was analyzed by MALLS, which indicated that the sized GBS Ia polysaccharide was about 80 kDa.

Further trials using microfluidization to size native GBS Ia polysaccharide (saccharide concentration of 7.25 mg/ml, pressure of between 10000 and 15000 psi) determined that 25 cycles of SEC-HPLC provided sized GBS Ia polysaccharide of about 100 kDa (confirmed by MALLS analysis). Integrity of sialic acid (important for immunogenicity) after sizing was demonstrated by nuclear magnetic resonance (NMR).

For the size reduction of native GBS Ib polysaccharide, 23 cycles were needed to reach the target size of about 100 kDa (saccharide concentration of 7.25 mg/ml, pressure of between 10000 and 15000 psi). MALLS analysis confirmed a size of about 105.6 kDa. Integrity of sialic acid (important for immunogenicity) after sizing was demonstrated by NMR.

Conjugation and HA Purification of Sized GBS Ia and Ib

Conjugation of the sized GBS Ia (about 100 kDa) polysaccharide, obtained as described above, was conducted as follows: purified sized polysaccharide underwent oxidation and subsequent ultrafiltration, followed by conjugation with CRM197.

Oxidation: The oxidation step was done using the same conditions as those used with a native polysaccharide. The same oxidation rate was observed for the sized GBS Ia and Ib polysaccharides, as that observed with native polysaccharides (±20%).

Coupling times: Four different coupling times were evaluated using sized GBS Ia and Ib polysaccharide (24 hours, 48 hours, 72 hours, and 96 hours).

Oxidation and conjugation of sized GBS Ib (about 105 kDa) polysaccharide (obtained as described above) was carried out using the same process as used for sized GBS Ia.

The resulting mixtures (containing conjugate, unconjugated CRM197, and unconjugated sized GBS Ia or Ib polysaccharide) underwent hydroxyapatite (HA) chromatography (CHT™ ceramic hydroxyapatite type I, 80 μm particle size, Bio-Rad Laboratories, Inc.) to separate the polysaccharide-CRM197 conjugate from free polysaccharide and free CRM197 carrier protein. The chromatography step (purification) was carried out as follows:

Load 0.6 mg CRM/ml resin;
Equilibration: 2 mM Na/Na$_2$PO$_4$, pH 7.2, 550 mM NaCl, 4 CV;
Load/rinsing: 2 mM Na/Na$_2$PO$_4$, pH 7.2, 550 mM NaCl, 5 CV;
Elution 1: 10 mM Na/Na$_2$PO$_4$, pH 7.2, 4 CV;
Elution 2: 35 mM Na/Na$_2$PO$_4$, pH 7.2, 4 CV;
Pool (conjugate)=from 0.5 CV of elution 1 to 3.75 CV of elution 2.
Stripping (collection of unconjugated carrier protein): 400 mM Na/Na$_2$PO$_4$, pH 7.2, 3 CV.

Free polysaccharide did not bind to the HA and was removed in the chromatography flow-through. Conjugate was collected by elution with phosphate buffer, as described. The conjugate obtained from the HA chromatography then underwent a quenching reaction, and subsequent filtration to provide the purified polysaccharide conjugate.

Characterization of Conjugates Produced Using Sized GBS Ia and Sized GBS Ib

As described above, four lots of CPS-CRM197 conjugate were produced using sized GBS Ia (MW about 100 kDa); each lot used a different coupling time as shown in Table 1. The lots were then treated with hydroxyapatite chromatography as described above to provide final product. For each lot, the free polysaccharide in the final product was <1% (of total PS by weight), showing that free (uncoupled) sized GBS Ia polysaccharide is removed during hydroxyapatite purification. Similar results were achieved using sized GBS Ib (mw about 105 kDa) polysaccharide.

TABLE 1

Sized GBS Ia -- characterization of final conjugate bulk

| | Coupling Time | PS Content μg/ml | Protein μg/ml | Glycosylation Degree (w/w) | Free PS % |
|---|---|---|---|---|---|
| 1 | 24 H | 478 | 518 | 0.92 | <1.0 |
| 2 | 48 H | 424 | 463 | 0.91 | <1.1 |
| 3 | 72 H | 511 | 507 | 1.00 | <0.9 |
| 4 | 96 H | 469 | 491 | 0.96 | <1.0 |

Example 3—Sized GBS Ia Conjugation Process Without Quenching and Filtration

Sized GBS Ia conjugation: The oxidation step was done using the same conditions as those used with a native polysaccharide. Three different oxidized batches were used, with 8 runs per batch. Conjugation temperature and reaction volume were respectively fixed to 22° C. and 4 ml. Conjugation reaction conditions were: CRM197 9 mg/ml, GBS Polysaccharide 11 mg/ml, NaCNBH3 9 mg/ml, 48 hours of reaction. This present example did not include quenching and filtration steps following hydroxyapatite chromatography.

Each conjugation reaction run was sampled and monitored at 24 h, 48 h, 72 h and 96 hours.

For each batch, an additional run at GBS Ia native PS set points (PS: 6.35 mg/ml, CRM197: 8.47 mg/ml, NaCNBH3: 6.35 mg/ml) was included.

TABLE 2

| | GBS Ia | | | | | |
|---|---|---|---|---|---|---|
| | Reaction conditions | | | | Conjugation Efficacy | |
| | Conjugation Time (Hours) | CRM197 (mg/ml) | PS (mg/ml) | NaCNBH3 (mg/ml) | PS conjugated (%) | CRM197 Conversion (%) | Final Bulk Free PS (%) |
| GBS Ia Existing process (Native PS) | IPC* to stop reaction | 8.47 | 6.35 | 6.35 | ~80% | ~35% | ~17-29% |
| GBS Ia sized Polysaccharide | 48 H | 9 | 11 | 9 | >70% (predicted) | >80% (predicted) | <1% |

*IPC: in-process characterization

The sized parameters selected were then evaluated on a process including HA chromatography and filtration, to confirm the above results.

TABLE 3

Sized GBS IA

| | 023 | 024 | 026 | T Predicted range (95% confidence interval) |
|---|---|---|---|---|
| Conjugation scale (mg) | 100 mg | 400 mg | 400 mg | |
| CRM197 Conversion (%) | 73% | 82.5% | 80.2% | 82.2-85.4 |
| PS Conjugated (%) | 72.1% | 74.0% | 73.3% | 71.7-75.2 |
| % Polydispersity > 180 Å | 39.3 | 44.1 | 41.9 | 34-40.8 |
| Radius (Å) | 183 | 195.1 | 192 | 193.6-198.6 |
| Glycosylation Degree | 1.1 | 1.1 | 1.1 | 1.0-1.1 |

TABLE 4

Sized GBS Ia

| | Lot number | Glycosylation Degree (w/w) | Free PS (%)* | Free Carrier (%)** | Hydrodynamic Radius (Å) |
|---|---|---|---|---|---|
| Existing (Native PS) Process | 007 | 1.7 | 20.1 | <1.7 | 387 (372) |
| | 008 | 1.5 | 19.7 | <2.3 | 407 |
| | 009 | 1.5 | 18.4 | <1.5 | 407 (390) |
| | 010 | 1.5 | 17 | <2.2 | 430 |
| Sized PS process | 023 | 1.0 | <1.3 | <1.0 | 238 |
| | 024 | 1.0 | <1.2 | <1.0 | 249 |
| | 026 | 1.1 | <1.2 | <1.0 | 248 |

Free PS by HPAEC-PAD Gal I; Free protein by μBCA (IPC)
*percentage of PS in the final product that is unconjugated
**percentage of carrier protein in final product that is unconjugated The present example using sized GBS Ia polysaccharide provided, after hydroxyapatite chromatography, a product with reduced free polysaccharide content (compared to the process using native GBS Ia polysaccharide). As expected, the size of the GBS Ia-CRM197 conjugate prepared using sized GBS Ia polysaccharide was smaller (compared to GBS Ia-CRM197 conjugate prepared using native GBS Ia polysaccharide) but was similar to the size of native GBS serotype III-CRM197 conjugate. The glycosylation degree was lower.

Example 4—Use of Sized GBS Serotype Ib Polysaccharide

For GBS Ib, a similar series of experiments was done as above for GBS Ia. Sized Lots were produced using the following conjugation parameters: CRM197 8 mg/ml, PS 10 mg/ml, NaCNBH3 9 mg/ml and 48 hours of reaction

TABLE 5

GBS Ib

| | Lot number | Glycosylation Degree (w/w) | Free PS (%)* | Free Carrier** (%) |
|---|---|---|---|---|
| Existing (Native PS) Process | 001 | 1.3 | 17.4 | <1.2 |
| | 002 | 1.1 | 18 | <1.8 |
| | 003 | 1.2 | 16.4 | <1.2 |
| | 004 | 1.1 | 17.2 | <1.8 |
| Sized PS process | 008A | 1.1 | <0.9* | <0.6 |
| | 008B | 1.2 | <0.7* | <0.6 |

*percentage of PS in the final product that is unconjugated
**percentage of carrier protein in final product that is unconjugated Example 5—Use of Sized GBS Serotype II Polysaccharide Increases Yield of Conjugate The present inventors investigated the use of sized GBS serotype II polysaccharides in the production of polysaccharide-protein conjugates. Native GBS II polysaccharide has a mean molecular weight of about 419 kDa. Microfluidisation technology as described above was used for the size reduction of native GBS II polysaccharide. Six cycles at 8000 psi produced GBS serotype II capsular polysaccharide having a mean molecular weight of 159 kDa. GBS PS are in liquid form and may vary slightly in PS concentration. Here, a first microfluidization of GBS II was done with PS at 5.42 mg/ml; the next microfluidization used GBS II with a PS concentration of 5.47 mg/ml.

Oxidation was performed using the same conditions as with a native GBS serotype II polysaccharide. Oxidation level of sized GBS II was near to that observed with a native GBS II PS (18.2% vs. 19.5-20.1%, respectively).

Conjugation and purification were performed according to existing process conditions for native GBS II PS. The CRM197 conversion (percentage of CRM197 that becomes conjugated) appeared slightly lower using sized GBS II PS than that obtained with a native GBS II PS (52.5% vs. 58-60%). For sized GBS serotype II PS, the free polysaccharide content before hydroxyapatite chromatography was estimated at 23.6%, compared to 6-7% with native GBS serotype II PS.

Using sized GBS serotype II polysaccharide rather than native polysaccharide, the yield of GBS serotype II PS was increased from 40% to 53%. To further improve the yield, conjugation conditions were assessed to increase % of conjugated PS.

To improve the conjugation step (increase the % of conjugated sized GBS II PS before the hydroxyapatite purification step), three lots at 700 mg PS scale were produced using the following conjugation reaction conditions: CRM197 6 mg/ml; Polysaccharide 11 mg/ml; NaCNBH3 9 mg/ml; 48 hours of reaction at 22° C.

The three lots demonstrated the same behavior in conjugation, as assessed by SEC-UPLC monitoring.

In purification, no significant loss of sized GBSII-CRM197 conjugate was observed in the flow through from the HA chromatography column.

TABLE 6

| Study | Hydrodynamic Radius (Rh) (Å) | % CRM197 conversion | % conjugated PS |
|---|---|---|---|
| 003 | 154 | 79 | 76.4 |
| 004 | 155 | 75 | 77.3 |
| 005 | 154 | 76.5 | 76.8 |

TABLE 7

| Study | Time (hour) | PS (μg/ml) RP-SEC-HPLC(1) | PS content (HPAEC-PAD) (2) μg/ml | CRM197 concentration (μBCA assay) (3) μg/ml | Glycosylation degree |
|---|---|---|---|---|---|
| 003 | 48 | 1931 | 1712 | 1170 | 1.46 |
| 004 | 48 | 904 | 865 | 598 | 1.45 |
| 005 | 48 | 898 | 842 | 571 | 1.47 |

(1) Reversed Phase (RP) Size Exclusion Chromatography (SEC) High Performance Liquid Chromatography (HPLC);

(2) High Performance Anion Exchange Chromatography (HPAEC) with Pulsed Amperometric Detection (PAD);

(3) Micro-bicinchoninic acid (μBCA) assay.

Example 6—GBS Ia-CRM197 Antibody Response in Mice

Mouse studies were carried out using GBS Ia-CRM197 conjugates produced using either native or sized GBS Ia PS (produced as described above), and using one of two conjugation processes, as listed in Table 8.

TABLE 8

GBS Ia - CRM197 conjugates

| Group | Conjugation Process | PS source |
|---|---|---|
| 1 (RS2505) | existing | native |
| 2 (009) | existing | native |
| 3 (014) | existing | Sized (80 kDa) |
| 4 (021) | existing | native |
| 5 (024) | improved | Sized (100 kDa) |
| 6 (025) | existing | Sized (100 kDa) |

The "Existing" conjugation process: PS conc = 6.35 mg/ml; initial PS/CRM ratio = 0.75/1 w/w; NaBH3C conc = 6.35 mg/ml.
"Improved" conjugation process: PS conc = 11 mg/ml; initial PS/CR ratio = 1.22/1 w/w; NaBH3CN conc = 9 mg/ml.

The study as set forth in Table 8 was repeated three times (with 32 mice per group, 16 mice per group, and 16 mice per group, for a total of 64 mice per group). Five-week old female CD1 mice were used in all groups. Conjugated polysaccharides were provided in aluminium hydroxide formulation 2 mg/ml, 1 µg immunization PS dose, administered at days 1, 21 and 35 via an intraperitoneal route (IP). With a 0.6 Standard Deviation, 64 mice was determined as the sample size per group to appreciate a two- to three-fold difference in IgG titers with at least 80% power.

Figure 4:
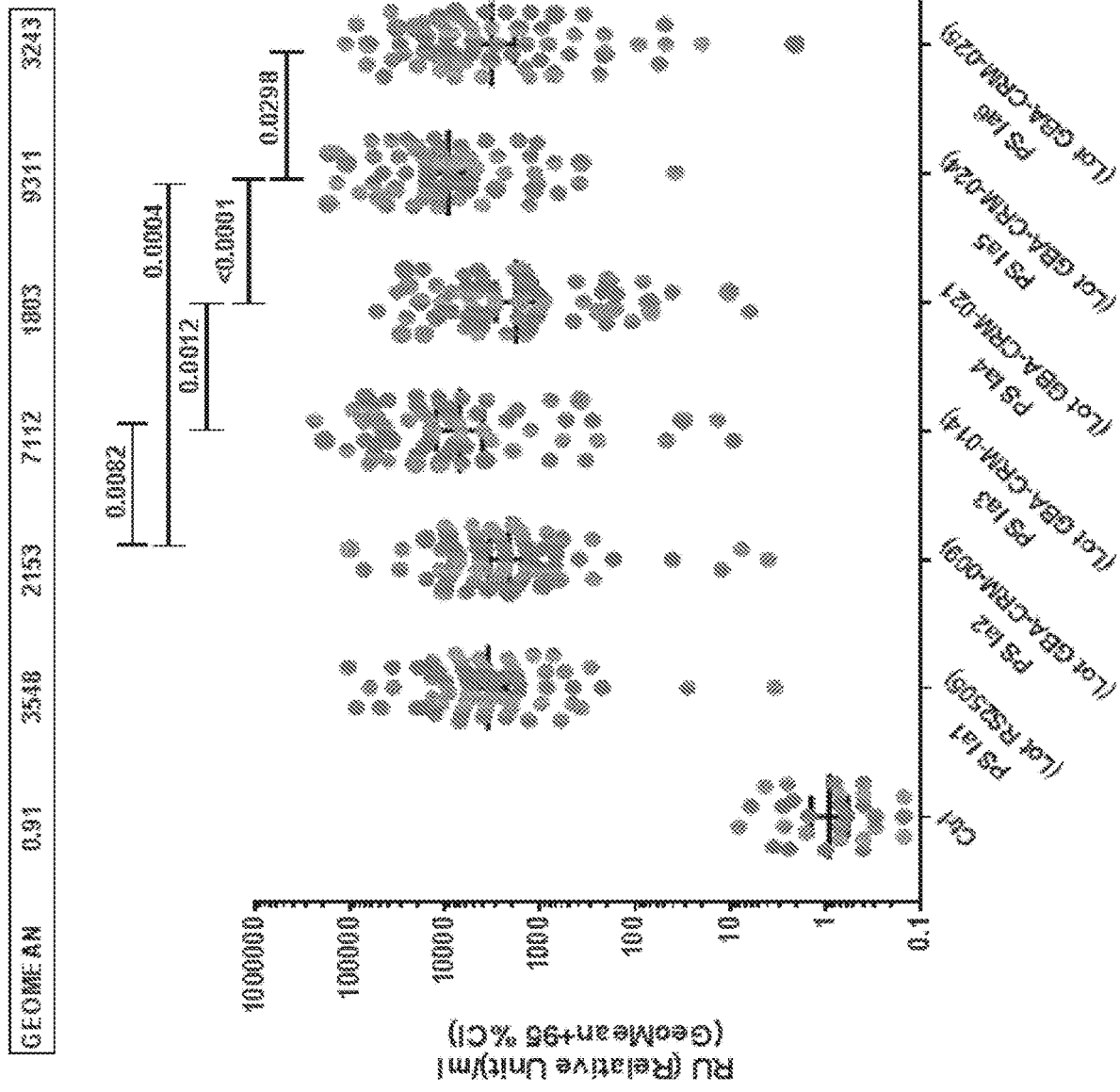
FIG. 4 shows the antibody response in mice, obtained using GBS CPS-CRM197 conjugates obtained by different processes.

Sera was collected from each mouse two weeks after the third immunization and tested for IgG titers using Luminex in monoplex PS Ia-Biotin (Relative Unit/ml or RU/ml). Streptavidin beads were coupled with 1 ug/ml of GBS PS Ia-biotin, and the bead set was incubated (1 hour) with individual mouse sera. Analysis confirmed that Group 5 (sized GBS Ia PS of 100 kDa, using improved conjugation process as described above) elicited a significantly higher antibody response in the tested mice (between 1.3- and 5.2-fold difference). Both Groups 3 and 5 showed higher titers compared to other groups. See FIG. 4, showing total results on the 64 sera/group. No differences within groups were detected among the three independent experiments. ANOVA P value adjusted for multiple comparison>0.1.

Example 7—GBS Ib-CRM197 Antibody Response in Mice

GBS Ib-CRM197 conjugates were also assessed in pre-clinical mouse studies. Five-week old female CD1 mice (64 mice per group) were immunized with the following:

TABLE 9

GBS Ib - CRM197 conjugates

| Group | Conjugation process* | PS source |
|---|---|---|
| 1 (RS2606) | Existing | Native |
| 2 (006) | Existing | Sized (100 kDa) |
| 3 (008A) | Improved | Sized (100 kDa) |

*as described above

Conjugated polysaccharides were provided in aluminium hydroxide (2 mg/ml) formulation, 1 µg immunization PS dose, administered at days 1, 21 and 35 via an intraperitoneal route (IP). Sera was collected from each mouse two weeks after the third immunization and tested for IgG titers by Luminex in monoplex PS Ib-Biotin assay; antibody functionality was tested by Opsonophagocytosis Killing Assay (OPKA) using pooled sera from each group.

Figure 5:
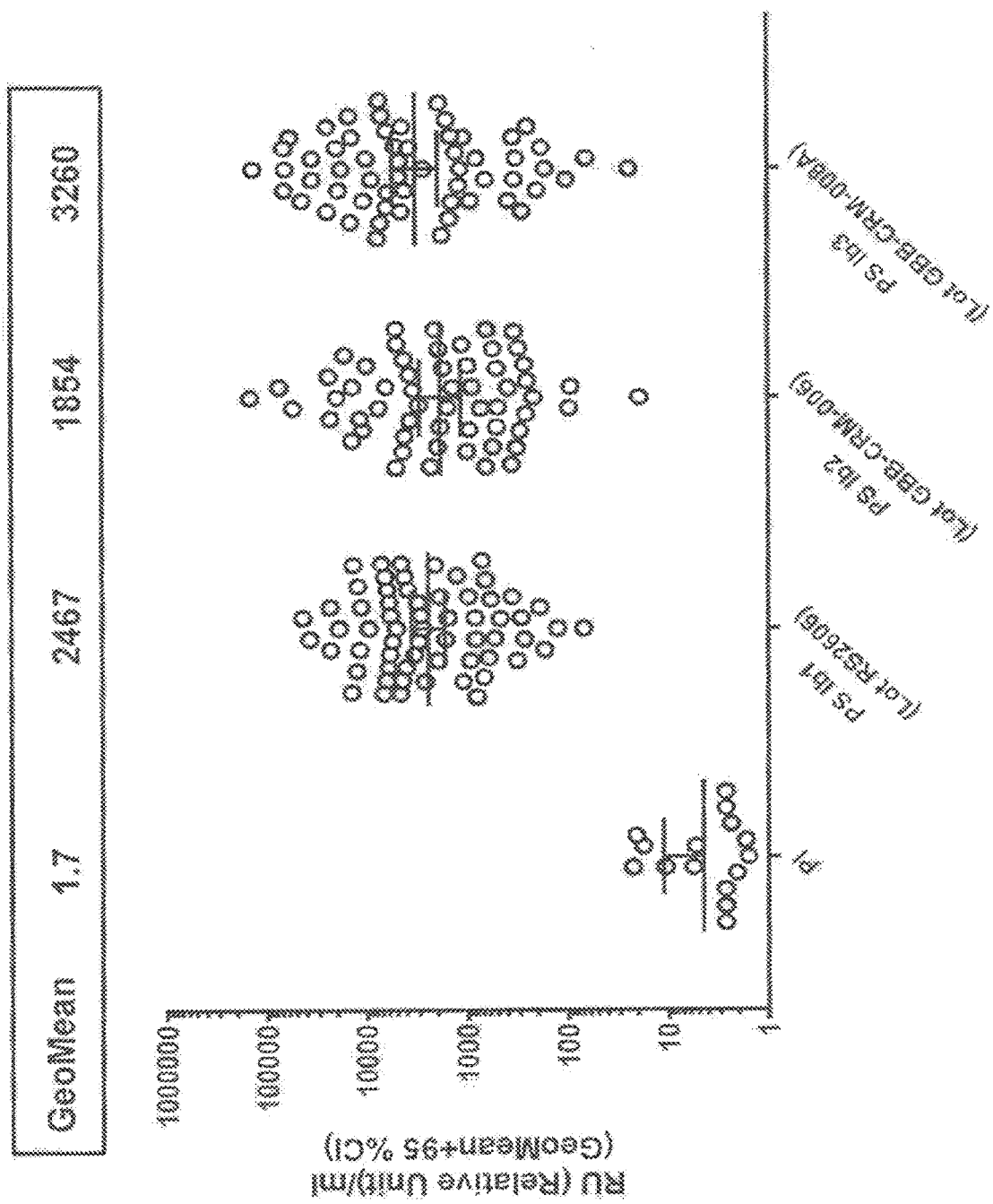
FIG. 5 indicates total IgG titers from individual sera for groups of mice, expressed as Relative Unit (RU) and Geometric Mean Titers±95% confidence intervals (shown as dot and bars, respectively).

FIG. 5 indicates total IgG titers from individual sera for each group, expressed as Relative Unit (RU) and Geometric Mean Titers±95% confidence intervals (shown as dot and bars, respectively). No significant differences in IgG response were found among the three GBS Ib groups.

OPKA Titers, expressed as reciprocal of the serum dilution resulting in 50% GBS killing, showed no major differences among the three GBS Ib groups (data not shown).

Example 8—GBS II-CRM197 Antibody Response in Mice

Three different preparations of GBS II-CRM197 (1 ug CPS, formulation with 2 mg/ml Alum, 200 ul administered by IP route at days 1, 21 and 35). Five-week old CD1 female mice, 64 total mice per formulation. Sera from immunized mice were collected two weeks after the third immunization and tested for IgG titers by Luminex assay, and for antibody functional activity by OPKA titers.

Three studies were conducted as shown in Tables 10-12:

TABLE 10

Study 1/GBS II-CRM197

| Group | # Mice | Bacterial Seed | Conjugation Process* | PS Source |
|---|---|---|---|---|
| 1 | 8 | Old seed, Lot EB26 | Existing | Native |
| 2 | 8 | Old seed, Lot EB26 | Existing | Native |
| 3 | 8 | Old seed, Lot EB26 | Existing | Native |
| 4 | 8 | New Seed, Lot 002 | Existing | Sized (160 kDa) |
| 5 | 8 | New Seed, Lot 002 | Existing | Sized (160 kDa) |
| 6 | 8 | New Seed, Lot 002 | Existing | Sized (160 kDa) |
| 7 | 8 | New seed, Lot 003 | Improved | Sized (160 kDa) |
| 8 | 8 | New seed, Lot 003 | Improved | Sized (160 kDa) |
| 9 | 8 | New seed, Lot 003 | Improved | Sized (160 kDa) |

*as described above

TABLE 11

Study 2/GBS II-CRM197

| Group | # Mice | Bacterial Seed | Conjugation Process* | PS Source |
|---|---|---|---|---|
| 1 | 8 | Old seed, Lot EB26 | Existing | Native |
| 2 | 8 | Old seed, Lot EB26 | Existing | Native |
| 3 | 8 | Old seed, Lot EB26 | Existing | Native |
| 4 | 8 | New Seed, Lot 002 | Existing | Sized (160 kDa) |
| 5 | 8 | New Seed, Lot 002 | Existing | Sized (160 kDa) |
| 6 | 8 | New Seed, Lot 002 | Existing | Sized (160 kDa) |
| 7 | 8 | New Seed, Lot 003 | Improved | Sized (160 kDa) |
| 8 | 8 | New Seed, Lot 003 | Improved | Sized (160 kDa) |
| 9 | 8 | New Seed, Lot 003 | Improved | Sized (160 kDa) |

*as described above

TABLE 12

Study 3/GBS II-CRM197

| Group | # Mice | Bacterial seed | Conjugation Process* | PS Source |
|---|---|---|---|---|
| 1 | 8 | Old seed, Lot EB26 | Existing | Native |
| 2 | 8 | Old seed, Lot EB26 | Existing | Native |

TABLE 12-continued

Study 3/GBS II-CRM197

| Group | # Mice | Bacterial seed | Conjugation Process* | PS Source |
|---|---|---|---|---|
| 3 | 8 | New Seed, Lot 002 | Existing | Sized (160 kDa) |
| 4 | 8 | New Seed, Lot 002 | Existing | Sized (160 kDa) |
| 5 | 8 | New Seed, Lot 003 | Improved | Sized (160 kDa) |
| 6 | 8 | New Seed, Lot 003 | Improved | Sized (160 kDa) |

*as described above

Figure 6:
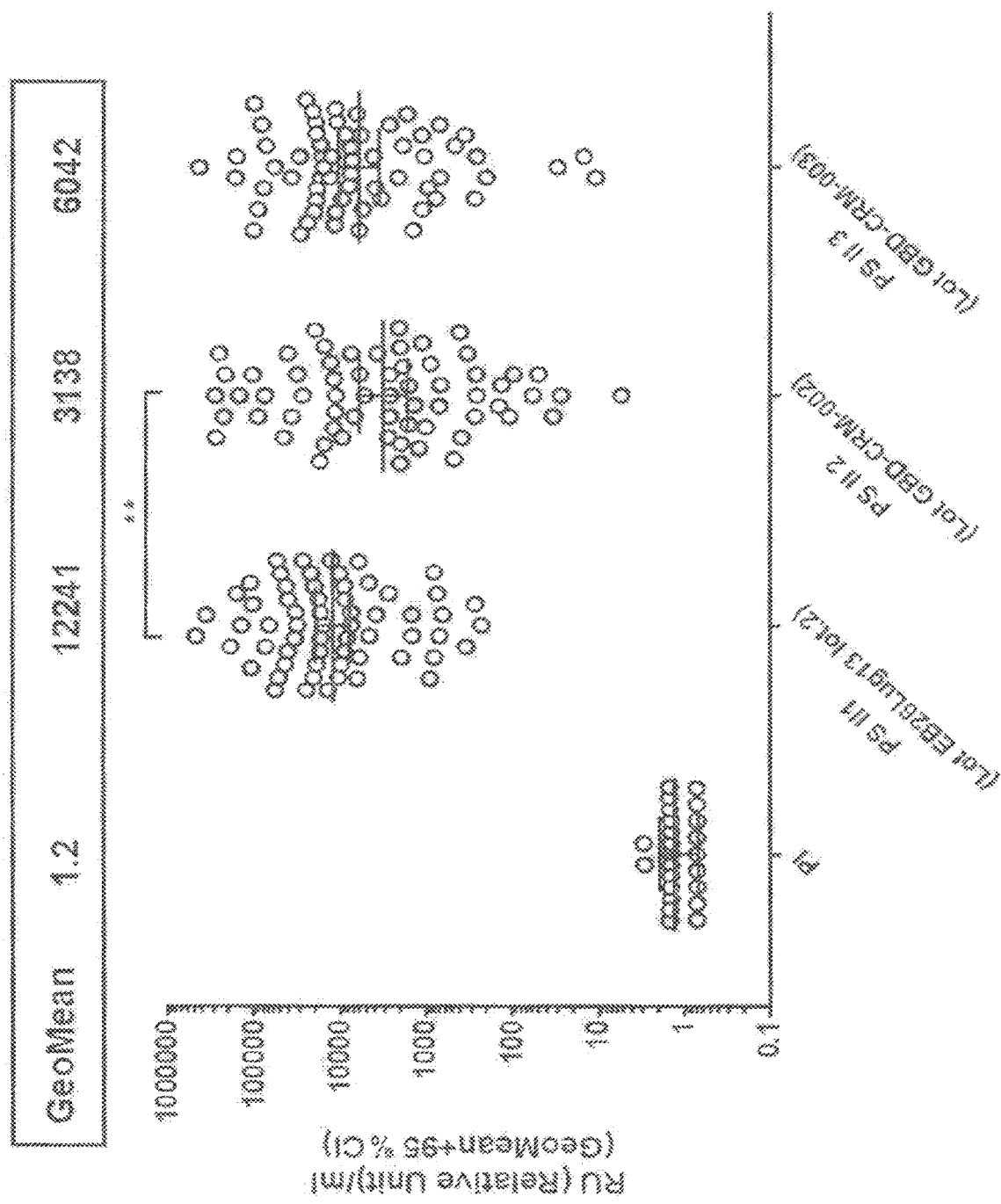
FIG. 6: IgG responses. Single mouse Luminex data (RU/ml) are represented as dots; the bars represent the Geometric Mean Titer±95% Confidence Interval (CI). The bar above the graph reports the obtained Geometric Mean IgG Titers (GEOMEAN).

Results from each of the three GBS II studies, and total results of merged studies:

In each of the three studies, all groups of mice immunized with a GBS II-CRM197 conjugate responded to vaccination, compared to control mice. In the exploratory statistical analysis (P value Adjusted for multiple comparison by ANOVA), significantly lower and more dispersed IgG responses were observed in Study 1 for Lot 002, with respect to the other two preparations (EB26 and 003); however, no significant differences in IgG responses were observed among the three (EB26, 002, and 003) in Studies 2 and 3. Overall, consistent data among the three studies were observed. Therefore, as primary objective, the data from all three studies (including a total of 64 mice) were merged in a final analysis, as shown in FIG. 6. The the exploratory statistical analysis (P value Adjusted for multiple comparison by ANOVA) indicated a statistically significant difference in IgG responses between preparation EB26 and 002.

FIG. 6: IgG responses—single mouse Luminex data (RU/ml) are represented as dots; the bars represent the Geometric Mean Titer±95% Confidence Interval (CI). The bar above the graph reports the obtained Geometric Mean IgG Titers (GEOMEAN).

OPKA Titers, expressed as reciprocal of the serum dilution resulting in 50% GBS killing, showed no major differences among the GBS II groups in the three studies (data not shown), though in accordance with IgG response measured by Luminex, in Study 1, groups 5 and 6 (002) showed lower OPKA titers with respect to the other conjugate preparations.

REFERENCES

Anderson (1983) Infect Immun 39(1):233-238.
Anderson et al. (1985) J Clin Invest 76(1):52-59.
Anonymous (Jan 2002) Research Disclosure, 453077.
Balmer et al. (2002) J Med Microbiol 51:717-722.
Baraldo et al. (2004) Infect Immun 72(8):4884-7.
Broker et al. (2017) Vaccine 35(25): 3286-3294.
Falugi et al. (2001) Eur J Immunol 31:3816-3824.
Kuo et al. (1995) Infect Immun 63:2706-13.
Lees et al. (1996) Vaccine 14:190-198.
Lei et al. (2000) Dev Biol (Basel) 103:259-264.
Pappenheimer (1977) Ann Rev, Biochem. 46: 69-94.
Peltola (2000) Clin Microbiol Rev 13:302-317
Rappuoli et al. (1983) Applied and Environ Microbiol 46(3):p560-564
Ruan et al. (1990) J Immunol 145:3379-3384.
Uchida et al., (1971) Nature New Biology 233: 8-11.
Vaccine (ed Plotkin et al) Fourth Edition ISBN 0-7216-9688-0
Wessels et al. (1989) Infect Immun 57:1089-94.
Wessels et al. (1990) J Clin Invest 86:1428-33.
Wuorimaa & Kayhty (2002) Scand J Immunol 56:111-129.
EP-A-0372501
EP-A-0378881
EP-A-0427347
EP-A-0471177
EP-A-0594610
EP0497524
EP0497525
WO1991/001146
WO1993/017712
WO1994/003208
WO1995/008348
WO1998/042721
WO1998/058668
WO2000/038711
WO2000/056360
WO2000/061761
WO2001/072337
WO2002/091998
WO2002/034771
WO2002/012294
WO2003/007985
WO2006/050341
WO2006/082527
WO2006/082530
WO2009/010877
WO2012/035519
U.S. Pat. Nos. 4,356,170
6,146,902
9,463,250

The invention claimed is:

1. A method of producing conjugates of Group B *Streptococcus* (GBS) capsular polysaccharide and a carrier protein, comprising:
 (a) providing sized GBS capsular polysaccharide molecules;
 (b) carrying out a conjugation reaction with said sized GBS capsular polysaccharide molecules and carrier protein molecules, to provide a mixture comprising polysaccharide-protein conjugates and free polysaccharides;
 (c) carrying out a chromatography step by contacting said mixture with hydroxyapatite under conditions wherein said conjugate binds to the hydroxyapatite, and wherein free polysaccharide does not bind to the hydroxyapatite;
 (d) removing free polysaccharide from the mixture; and
 (e) recovering conjugate from the hydroxyapatite,
  wherein said Group B *Streptococcus* (GBS) capsular polysaccharide is selected from GBS serotype Ia, serotype Ib, and serotype II, wherein the sized GBS capsular polysaccharide has an average molecular weight of between about 50 kilodaltons (kDa) and about 200 kDa, wherein the carrier protein is CRM197, wherein the conjugate produced by this method contains low free polysaccharide content (less than 10% of the total weight of polysaccharide in the conjugate).

2. The method of claim 1, wherein the GBS capsular polysaccharide is selected from sized GBS serotype Ia capsular polysaccharide having an average molecular weight of about 100 kDa, sized GBS serotype Ib capsular polysaccharide having an average molecular weight of about 100 kDa, and sized GBS serotype II capsular polysaccharide having an average molecular weight of about 160 kDa.

3. The method of claim 1, wherein the capsular polysaccharide is glycosylated.

4. The method of claim 1, wherein the capsular polysaccharide is conjugated to the carrier protein by a linker.

5. The method of claim 1, wherein the chromatography step is carried out at a pH of from about 6.5 to about 7.5.

6. The method of claim 5, wherein the chromatography step is carried out at about pH 7.2.

7. The method of claim 1, wherein recovery of the conjugate is by elution using one or more buffers having a phosphate concentration selected from between about 5 mM to about 50 mM, between about 5 mM to about 40 mM, between about 10 mM to about 40 mM, and between about 10 mM to about 35 mM.

8. The method of claim 1, further comprising mixing the recovered capsular polysaccharide conjugate with a pharmaceutically acceptable diluent or carrier thereby preparing a pharmaceutical composition.

9. The method of claim 8, further comprising mixing the pharmaceutical composition with an adjuvant.

* * * * *